United States Patent [19]

Brill

[11] 4,309,983
[45] Jan. 12, 1982

[54] SOLAR HEAT COLLECTOR

[76] Inventor: Robert Brill, 815 Nile, Golden, Colo. 80401

[21] Appl. No.: 61,318

[22] Filed: Jul. 27, 1979

[51] Int. Cl.³ .............................................. F24J 3/02
[52] U.S. Cl. .................................. 126/422; 126/429; 126/432
[58] Field of Search ............... 126/450, 422, 428, 429, 126/431, 432; 52/171, 172

[56] References Cited

U.S. PATENT DOCUMENTS

| 3,932,971 | 1/1976 | Day | 52/171 |
| 3,990,635 | 11/1976 | Restle et al. | 126/422 |
| 4,147,300 | 4/1979 | Milburn, Jr. | 126/429 |
| 4,159,707 | 7/1979 | Miquel | 126/429 |
| 4,203,424 | 5/1980 | Coxon et al. | 126/422 |
| 4,212,292 | 7/1980 | Reinert | 126/429 |

Primary Examiner—Carroll B. Dority, Jr.
Attorney, Agent, or Firm—Stephen A. Gratton

[57] ABSTRACT

A solar heat collector adapted to be mounted in an exterior doorway of a structure. The solar heat collector generally stated comprises a heat absorbant inner door, a transparent outer door mounted in spaced relation to the heat absorbant inner door, and means for circulating air between the inner and outer doors or through the inner door for extracting the absorbed heat for distribution and use.

7 Claims, 5 Drawing Figures

SOLAR HEAT COLLECTOR

FIELD OF THE INVENTION

This invention relates generally to solar heat collectors and more particularly to a new and improved solar heat collector adapted to be mounted in an exterior doorway of a structure.

DESCRIPTION OF THE PRIOR ART

Solar energy collectors for collecting and utilizing radiant energy are well known in the prior art. Generally these collectors comprise some type of collector body for absorbing solar radiation and some means for circulating a heat transport medium such as air or water around the collector bodies to extract the collected heat. Once the heat is extracted by the transport medium it can then be distributed and utilized as required.

In the past it has been common practice to install solar energy collectors on the roof and sometimes on the exterior walls of a structure. Because the collectors are generally bulky and relatively complex devices however, installation on a roof top or exterior wall is a difficult and complex job that requires the services of several trained professionals. In general this makes the installation of any type of solar collector prohibitively expensive for most homeowners. In addition maintenance and upkeep of such systems is also relatively expensive.

The present invention on the other hand, is directed to a solar collector of simple construction which is adapted to be easily installed in an exterior doorway of a structure to convert what would otherwise be a heat sink into a positive heat collector. In addition with the solar collector of the present invention existing exterior doors and storm doors may be easily modified for use in the system. The invention thus allows an effective solar collector to be inexpensively installed by a relatively unskilled laborer such as the typical American homeowner.

SUMMARY OF THE INVENTION

A solar heat collector adapted to be mounted in an exterior doorway of a structure. Generally stated the solar heat collector comprises a heat absorbant inner door, a transparent outer door mounted in spaced relation to the heat absorbant inner door, and means for circulating air between the inner and outer doors or through the inner door for extracting the absorbed heat for distribution.

In one form of the invention an existing exterior door and glass storm door may be modified to function as a solar collector by adding black collector plates to the outer surface of the exterior door, an inlet opening for drawing cool air between the doors and an outlet for exhausting heated air from between the doors. Component parts of the invention can thus be distributed in "kit" form.

DETAILED DESCRIPTION OF THE INVENTION

Figure 1:
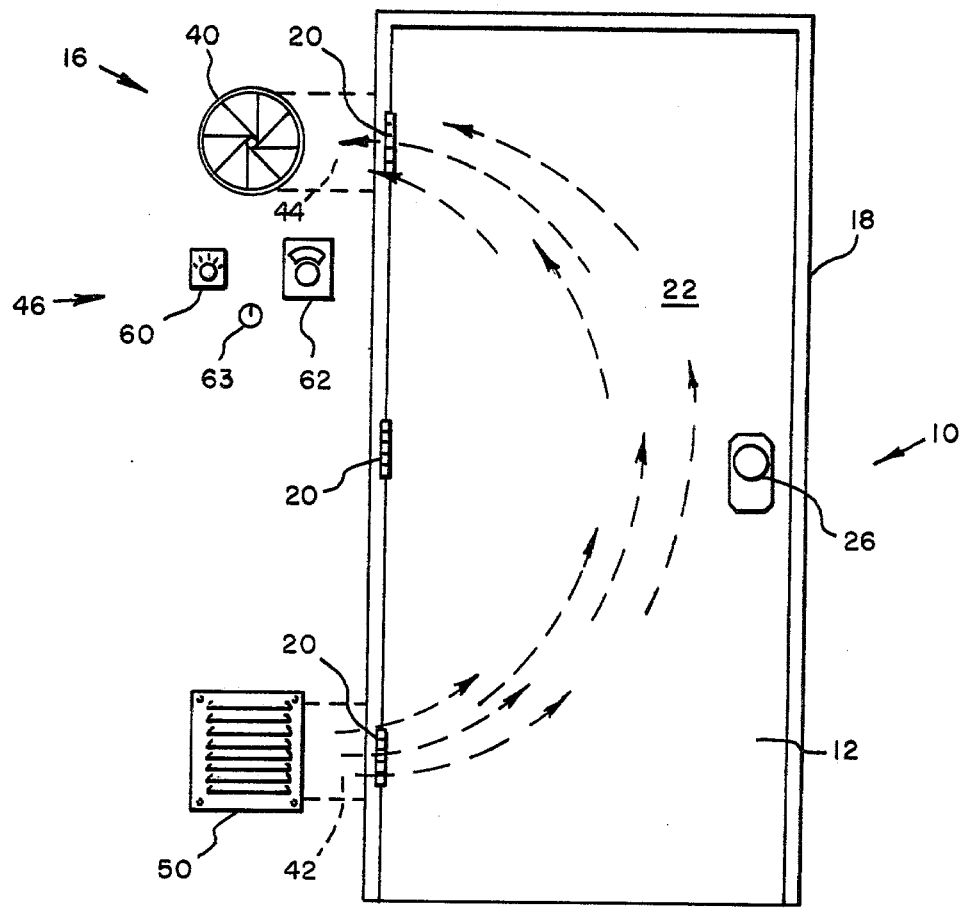
FIG. 1 is a rear elevation view of an exterior doorway solar collector constructed in accordance with the invention.
Figure 2:
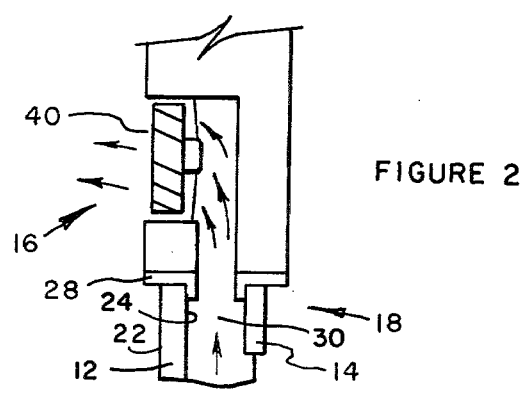
FIG. 2 is a top plan view of FIG. 1.

Referring now to FIGS. 1 and 2 a solar collector constructed in accordance with the invention is shown and generally designated as 10. In the form of the invention shown the solar collector 10 generally stated comprises, a heat absorbing inner door 12, a transparent outer door 14 mounted in spaced relation to the heat absorbing inner door 12, and circulation means 16 for drawing air flow between the doors 12 and 14 to extract and transport the absorbed heat away from the inner door 12 for use.

The heat absorbing inner door 12 is mounted in a conventional manner to an exterior doorway 18 on metal hinges 20 attached to the doorway 18. The door 12 has an inner side 22 and an outer heat absorbing side 24 and includes a doorknob asembly 26 that latches the door 12 in the doorway 18. The heat absorbing inner door 12 is preferably mounted in a location such as on the south side of a structure where exposure of its outer side 24 to sunlight is high.

The heat absorbing inner door 12 may be made of an efficient heat absorbing material such as black metal. Alternatively a door of any other suitable material may be used and fitted with black metal or other suitable heat absorbing collector plates on its outer side 24. The heat absorbing inner door 12 is preferably tightly fitted to the door jambs 28 of the doorway and weatherstripping or other sealing material may be used to seal around the door 12.

The transparent outerdoor 14 is mounted on the exterior of the structure parallel to and spaced from the heat absorbing inner door 22 as is a conventional screen or storm door. The transparent outer door 14 is also tightly fitted to the doorway 18 so that a sealed chamber 30 is formed between the heat absorbing inner door 12 and transparent outer door 14. The sealed chamber 30 is suitable for directing air flow between the doors for heat extraction. The transparent outer door is preferably transparent across its entire length to allow exposure of the inner door 12 to a maximum amount of solar radiation.

The outer transparent door 14 may be constructed as a conventional storm door with a metal or wooden frame and a transparent glass body. Alternately transparent panels of any other suitable transparent material such as "Kalwall" panels manufactured by the Kalwall Corporation of Manchester, N.H. may be used in place of glass for the body of the outer transparent door 14.

As with the heat absorbing inner door 2 the transparent outer door 14 is swingably mounted in a conventional manner to the doorway 18 on hinges (not shown) and may have a door knob assembly to latch the door to the doorway.

The circulation means 16 for drawing air flow between the doors 12 and 14 includes an electric exhaust fan 40, a cool air intake duct 42 coupled to the sealed chamber 30 between the doors, a hot air exhaust duct 44 coupled to the exhaust fan 40 and to the sealed chamber 30, and a control circuit 46 for operating the exhaust fan 40.

The cool air intake duct 42 is located in the wall adjacent to the doorway 18 preferrably towards the bottom of the doors 12 and 14. The cool air intake duct 42 extends from an intake grill 50 in the wall through the doorjamb 28 and to the sealed chamber 30 between the doors 12 and 14.

The hot air exhaust duct 44 is also located in the wall adjacent to the doorway 18 preferrably towards the top of the doors 12 and 14. The hot air exhaust duct 44 extend from the electric exhaust fan 40 through the doorjamb 28 to the sealed chamber 30 between the door 12 and 14.

With this arrangement air flow can be drawn by the exhaust fan 40 from the cool air intake vent 50 through the sealed chamber 30 between the doors 12 and 14 and out of the exhaust fan 40, as illustrated by the arrows shown in FIG. 1. Since the cool air intake vent 50 is exposed to the coolest air near the floor of a room, cool air can be drawn between the doors, heated by flow around the heat absorbing outer surface 24 of the heat absorbing inner door 12 and then discharged into the room for heating the room.

Figure 5:
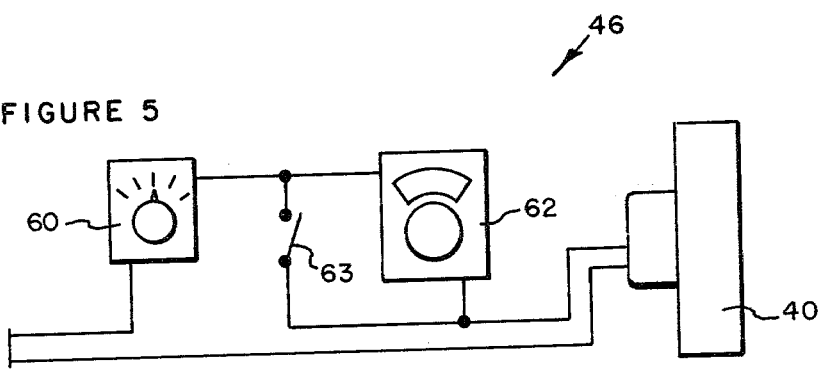
FIG. 5 is a schematic wiring diagram of a control system for a solar collector constructed in accordance with the invention.

Referring now to FIG. 5 a control circuit 46 for operating the electric exhaust fan 40 is shown. The control circuit includes a fan control switch 60 coupled to a power supply, a thermostat 62 for detecting the temperature of the air between the doors 12 and 14, and a manual on-off switch 63 for the circuit. The circuit can be set up such that a rise in temperature of the air between the doors 12 and 14 above a preselected high temperature can be detected by the thermostat 62 to actuate the fan control switch 60 and turn on the exhaust fan 40. Likewise a drop in the temperature of the air between the doors below a preselected low temperature will be detected by the thermostat 62 to shut off the exhaust fan 40.

Manual switch 63 can be utilized to bypass the thermostat 62 for operating the exhaust fan 40. This would be desirable when the room temperature within the structure is higher than the temperature between the doors. In that situation the fan could be actuated to exhaust hot air from the room. The solar collector could thus function as a heat sink during warm weather.

Figure 3:
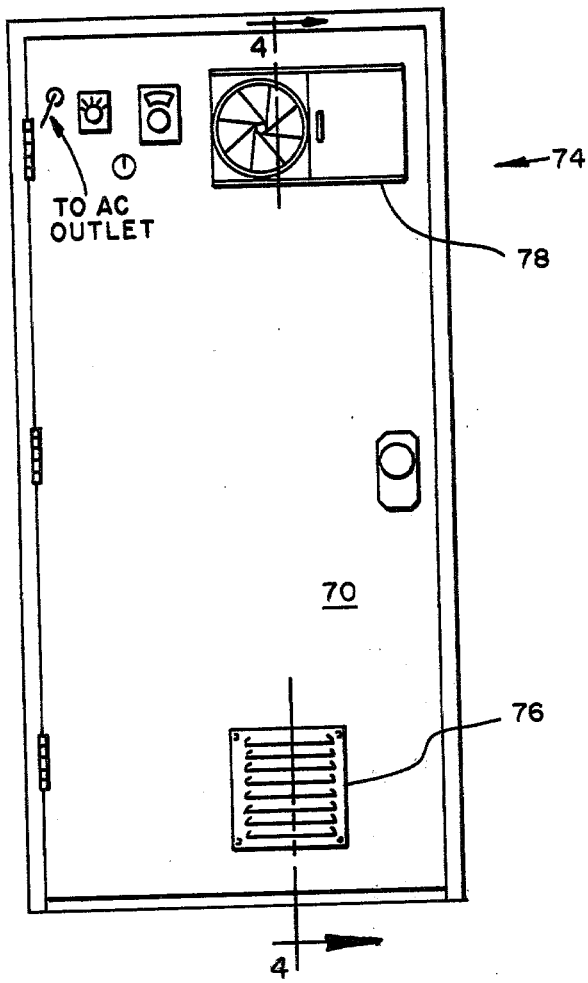
FIG. 3 is a rear elevation view of an existing exterior door and screen door modified as a solar collector in accordance with the invention.
Figure 4:
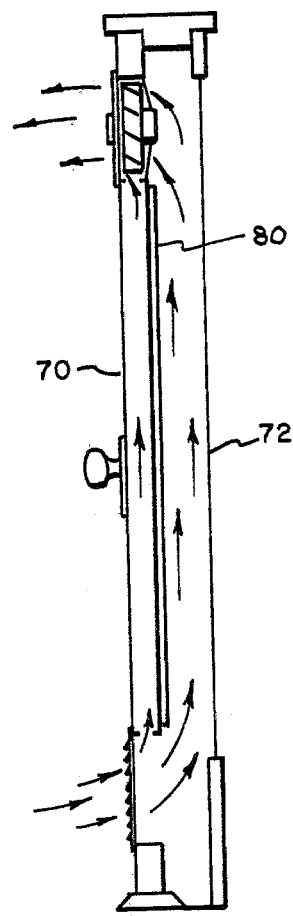
FIG. 4 is a cross sectional elevation view taken along section line 4—4 of FIG. 3.

Referring now to FIGS. 3 and 4 an alternate embodiment for the solar collector of FIG. 1 is shown. The main difference in the embodiment illustrated in FIGS. 3 and 4 from the previously described embodiment of the invention is that the cool air intake and hot air exhaust are mounted in the inner heat absorbing door rather than in the wall adjacent to the doorway. This configuration allows an existing door to be easily modified for use a solar collector.

Generally stated the embodiment shown in FIGS. 3 and 4 comprises a heat absorbing inner door 70, a transparent outer door 72, and circulating means 74 for circulating cool air through and between the doors for picking up heat from the heat absorbing inner door 70.

The absorbing inner door 70 is a hollow core door and a cool air intake grill 76 and exhaust fan 78 are mounted directly to the inner side of the door to draw air flow as illustrated by the arrows between the doors 70 and 72 and through the heat absorbing inner door 70. The exhaust fan 78 may be coupled to a power supply as shown through the hinge of the door. In addition a heat absorbing collector plate 80 can be attached to the outer heat absorbing side of the door for collecting radiant energy which impinges on the door. The collector plate may be provided with a decorative design for appearance purposes. Alternatively the door 70 may be painted a black heat absorbing color.

Other than the aforementioned differences the solar collector disclosed in FIGS. 3 and 4 functions in exactly the same manner as the collector previously described. The component parts for converting an existing door and storm door to a collector as illustrated in FIGS. 3 and 4 can be easily distributed in kit form.

The solar collector embodiment disclosed may be further modified by the use of intake valves rather than simple intake grills. Additionally for convenience, a porch light may be added to the control circuit shown in FIG. 5 or included with the electric fan assembly 78. In addition, a Kalwall kick plate can be added to an existing storm door in place of the metal kick plate that is typically found on such doors to increase the transparent area of the door.

Thus as disclosed, in addition to being easily constructed from scratch, a solar collector can be fabricated in a doorway in accordance with the present invention by modifying an existing exterior and screen door combination. Component parts for the conversion can thus be easily distributed in kit form.

While various embodiments and modification of this invention have been described in the foregoing description, further modification will be apparent to those skilled in the art. Such modificatios are intended to be included within the scope of this invention as defined by the following claims.

What is claimed is:

1. A solar heat collector mounted in an exterior doorway of a dwelling, said collector comprising;
   a heat absorbant inner door having a heat absorbant outer side for absorbing solar radiation which impinges thereon and hingedly connected to said doorway;
   a transparent outer door mounted parallel to and spaced from the inner door and hingedly connected to said doorway such that a closed chamber is formed between the inner and outer door; and
   circulation for circulating air through the closed chamber for picking up heat from the heat absorbant inner door including an air intake means coupled to the chamber between the doors for providing air to the chamber from said dwelling, an air outlet means connecting the chamber with the interior of the dwelling, and an exhaust fan coupled to the chamber for drawing air flow from the air intake through the chamber for heating and then into the dwelling.

2. The solar collector as defined in claim 1 and wherein said circulation means includes an air flow passage through the heat absorbant inner door.

3. The solar collector as defined in claim 2 and wherein the transparent outer door comprises a glass storm door.

4. The solar collector as defined in claim 3 and wherein the outer side of the heat absorbant inner door has black metal collector plates attached thereto.

5. The solar collector as defined in claim 4 and further comprising a control circuit for operating the electric exhaust fan including a thermostat for measuring the air temperature the heat absorbant inner door and transparent outer door to an on-off switch for the electric fan.

6. The solar collector as defined in claim 5 and wherein the air intake means and exhaust fan are mounted to the inner side of the heat absorbant door.

7. The solar collector as defined in claim 5 wherein the air intake means and exhaust fan are mounted to a dwelling wall adjacent to the solar collector.

* * * * *